April 15, 1952     J. C. MATCHETT     2,592,929
LIQUID LEVEL GAUGE
Filed April 11, 1949
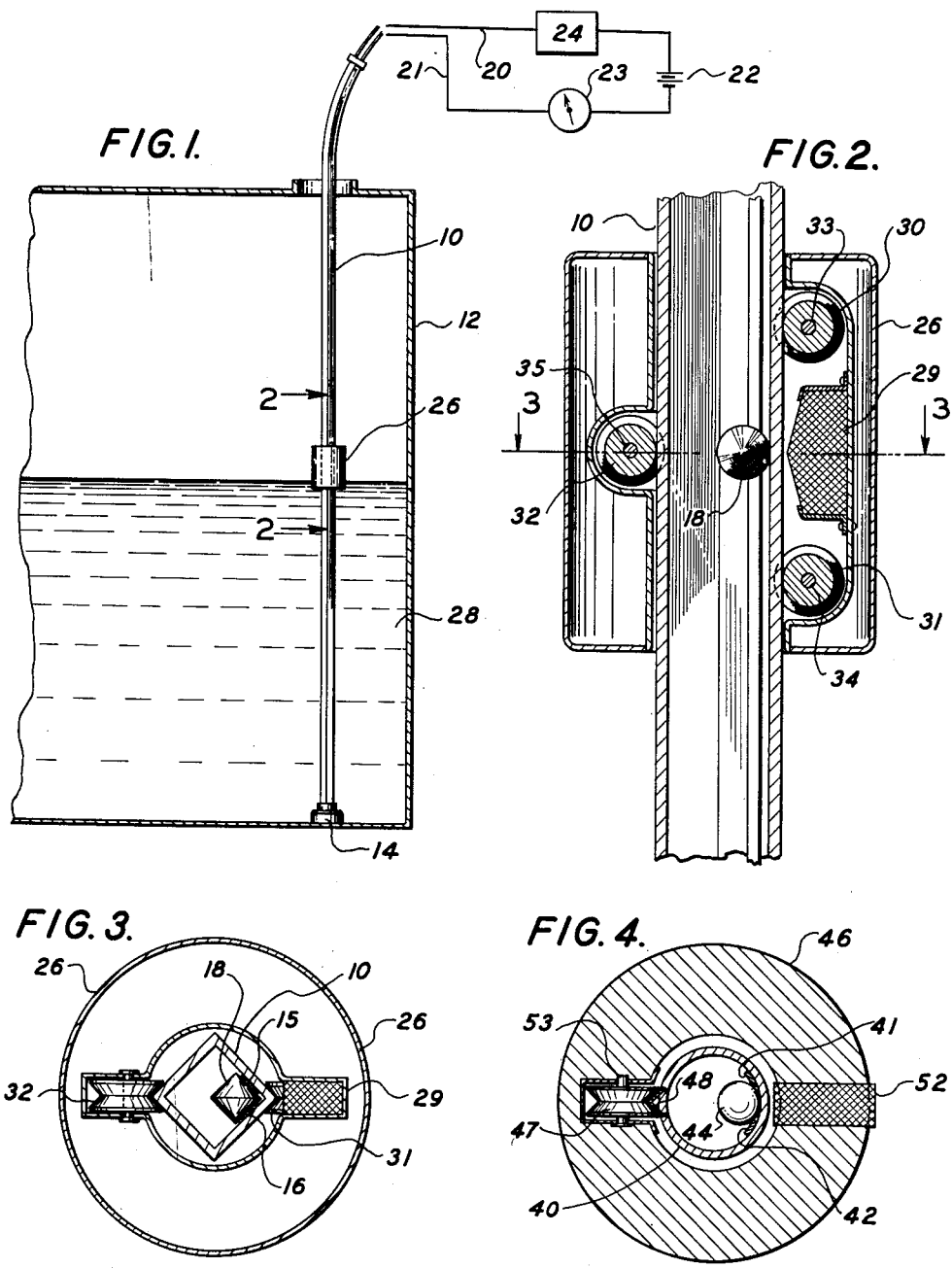
INVENTOR.
JOHN C. MATCHETT
BY
ATTORNEY Patented Apr. 15, 1952

2,592,929

UNITED STATES PATENT OFFICE 2,592,929

LIQUID LEVEL GAUGE

John C. Matchett, East Pasadena, Calif.

Application April 11, 1949, Serial No. 86,800

6 Claims. (Cl. 73—313)

This invention relates to a liquid level gauge particularly adapted to use in large liquid storage vessels or tanks.

The gauge of the invention is automatic in its operation, inexpensive to manufacture and install, highly accurate and substantially unaffected by changes in temperature within the storage vessel. A feature of the invention is that all metal to metal contacts and all electrical elements may be hermetically sealed in an inert atmosphere if desired so as to be inacessible to inflammable or explosive liquids or vapors. This feature of the apparatus of the invention distinguishes it from other liquid level gauges and makes possible the use of the gauge in vessels containing inflammable materials. Hence, the gauge finds wide-spread application in petroleum refineries, chemical plants, etc.

The gauge of the invention comprises an elongated, preferably flexible, non-metallic tube on the inside wall of which are mounted a pair of electrically conductive ribbons or wires which extend substantially the length of the tube and parallel to the longitudinal axis thereof. A buoyant float is mounted over the tube and is free to ride up and down the tube to follow the level of the liquid in a tank in which the tube is placed. An electrically conductive and paramagnetic ball is disposed within the tube and engages each of the pair of ribbons or wires. A permanent magnet is mounted in the float on the outside of the tube, the magnet having sufficient force to attract the ball and hold it against the conductive ribbons in the tube and at a level corresponding to the level of the magnet. The conductive ribbons within the tube are connected through one end of the tube to an external circuit including a voltage source and an ammeter. Variations in the height of the float due to variations in liquid level produce corresponding variations in the position of the ball within the tube. The ball acts to short the circuit between the two ribbons. The ribbons act as two resistance elements in a series circuit, so that the position of the ball has a direct bearing on the magnitude of the current flowing through the circuit. Thus when the ball is at the upper end of the tube the resistance introduced into the circuit by the two ribbons is considerably lower than when the ball is at the lower end of the tube. The current flowing through the circuit will vary accordingly and may be calibrated to give an exact measure of the level of the liquid in a storage tank in which the tube is placed.

The invention will be more clearly understood by reference to the following detailed description thereof taken in conjunction with the accompanying drawing in which:

Fig. 1 is an elevation view of the apparatus of the invention inserted in a storage tank shown in partial section;

Fig. 2 is a sectional elevation taken on the line 2—2 of Fig. 1;

Fig. 3 is a section taken on the line 3—3 of Fig. 2; and

Fig. 4 is a horizontal section through the tube and float of an alternative embodiment of my invention.

The embodiment of the invention shown in Figs. 1 to 3 of the drawing comprises an elongated tube 10 suspended vertically in a storage tank 12. The lower end of tube 10 is provided with a weighted base 14 which insures that the tube will remain vertical in the tank. The base 14 may be rested on the bottom of the storage tank as shown or may be suspended above the bottom if for any reason such practice becomes expedient. Alternatively, the tube may be anchored to the tank bottom. In such case a heavy base is not needed.

Two elongated conductive wires or ribbons 15, 16 are mounted on the inside of the tube parallel to each other and extending substantially the length of the tube parallel to the longitudinal axis thereof. A ball or roller 18 is disposed within the tube 10 and is adapted to ride along the ribbons 15, 16 in the manner hereinafter described. The ribbons 15, 16 may be thought of as forming a track within the tube along which the ball is caused to travel.

As shown in Fig. 1 the two ribbons are connected by means of leads 20, 21 respectively in an external circuit which includes a voltage source 22 and an ammeter 23. With a constant voltage impressed in the circuit by source 22, it will produce a current in the circuit dependent upon the magnitude of the resistance of the circuit. The ball 18 and the ribbons 15 and 16 are conductive with the ribbons 15, 16 having a comparatively high resistance. Thus the ball shorts the circuit from one ribbon to the other, the magnitude of the resistance in the circuit being a function of the position of the ball along the length of the tube 10. In accordance with Ohm's law, the current flowing through the circuit is a function of voltage and resistance. Since the voltage is maintained constant the current measured in meter 23 will be inversely proportional to the resistance of that portion of ribbons 15 and 16 in the circuit at any moment.

Voltage source 22 may be a D. C. or an A. C. source; if the former, it may be one or more dry cells or a storage battery. Since the liquid level is determined by current flow through the circuit it is important that a constant voltage be supplied by the source 22. Alternatively, and if desired, a voltage regulator 24 can be included in the circuit, in which case the constancy of the source is not critical. One advantage of the invention lies in the fact that the gauge can be used in remote localities where no independent A. C. power supply is available since the gauge may be operated on D. C. power obtained from conventional batteries.

A float 26 is mounted around tube 10, being free to travel along the length of the tube and being of sufficient buoyancy to float on liquid 28 in tank 12. A permanent magnet 29 is supported by the float and serves to fix the location of ball 18 within tube 10. As the float, following the level of liquid in tank 12, rides up and down tube 10, the magnet 29 carries the ball up and down ribbons 15, 16. As the ball moves, meter 23 registers a current change indicative of the level of liquid in the tank.

Since operation of the gauge is dependent upon variations in resistance in the circuit, the only effect of temperature changes on the gauge is in induced changes in resistance. By selection of a material having a low temperature coefficient of resistivity the effect of temperature changes becomes negligible. For example constantan, at 25° C., has a temperature coefficient of resistivity of 0.000002. Hence for a 1° temperature change at 25° C., $$R_{26°} = 1.000002 \, R_{25°}$$

and for a 10° temperature change $$R_{35°} = 1.00002 \, R_{25°}$$

It is apparent that for all practical purposes the effects of temperature can be ignored if materials having low temperature coefficients of resistivity are used.

The float 26 may take substantially any form as for example, the hollow housing illustrated in Figs. 1 to 3. Preferably, the float is non-metallic so that the gauge may be employed universally with inflammable or non-inflammable materials. It is important that magnet 29 be aligned with respect to tube 10 so as to hold ball 18 against the conducting ribbons 15, 16. To accomplish this in the embodiment shown in Figs. 1 to 3 tube 10 is squared and the float 26 is provided with rollers 30, 31, 32 which are shaped to ride on opposite corners of tube 10. In this fashion the float is centered on the tube and does not contact the tube except through the rollers. At the same time rotary motion of the float with respect to the tube is prevented. Each of rollers 30, 31, 32 are mounted in the float on pins 33, 34, 35 respectively. If the float is constructed as a hollow housing as shown in the drawing, the inner circumference of the housing may be recessed to receive the rollers. It is evident that other types of floats may be employed and other means for guiding the float on the tube and preventing relative rotation of the float on the tube are feasible. One such alternative means is shown in Fig. 4 wherein a portion of a liquid level gauge in accordance with the invention is shown as including a cylindrical tube 40, conductive ribbons 41, 42 mounted adjacent and parallel to each other along a wall of a tube, a roller 44 adapted to travel along the ribbons 41, 42, a float 46 mounted around the tube and having a roller 47 engaging a longitudinal rib 48 on the outside of the tube. The float 46 in the embodiment shown in Fig. 4 is a solid buoyant material, say cork, wood, plastic etc. in which is mounted a permanent magnet 52. The inner wall of the cylindrical float is notched to form a housing for roller 47 which is mounted therein on a pin 53. The roller 47 engaging on the rib 48 guides the float along the tube.

Although not a necessary feature of the invention, it is preferable that tube 10 be made of flexible material for example a chemically resistant plastic. In this form the tube may be rolled into a coil to facilitate shipment and storage. Although not a necessary feature of the invention the tube is preferably non-metallic particularly where the gauge is to be used in conjunction with inflammable liquids. As a further precautionary measure, the tube may be sealed at both ends to prevent ingress of inflammable vapors. Additionally the tube may be filled with an inert atmosphere under a positive pressure. These precautions are, of course, not necessary when the gauge is to be used with non-inflammable liquids.

The tube may be of substantially any cross-sectional shape, the preferred shape being dependent upon manufacturing costs having in mind that a square or rectangular tube provides means for guiding the float without addition of any external ribs or guiding track.

The ball or roller, such as the roller 18 shown in Figs. 2 and 3, must be a paramagnetic material so that its movement can be controlled by the magnet disposed in the float. It must also be conductive so that it will short the parallel ribbons along which it travels. However, the ball may be of any shape as for example the double conical shape of ball 18 (Fig. 3) or spherical as the ball 44 (Fig. 4). In general the ball is shaped to adapt it to the contours of the particular tube to which it is employed.

Briefly, I have provided a liquid level gauge in which a contacting element is free to travel along the inside of an elongated tube and in so doing to short two elements of a series circuit disposed in the tube. A float mounted around the tube carries a magnet which governs the movement of the conducting element within the tube and hence alters the resistance of the series circuit as a function of the level of the liquid supporting the float. It is obvious that a great number of modifications in the particular means of attaining these results may be employed without departing from the scope of my invention.

I claim:

1. A liquid level gauge comprising an elongated tube of rectangular cross section adapted to be suspended in a vertical position in a liquid storage tank, a pair of elongated contacting elements mounted within the tube parallel to the longitudinal axis thereof, a contacting element disposed in the tube and free to travel therein in contact with the pair of contacting elements, a source of voltage connected across said contacting elements, current indicating means connected in series with said source of voltage, an annular float mounted around said tube and adapted to float on the liquid in said storage tank, guide means affixed to the float and engaging a corner of the tube to center the float around the tube and to prevent rotation of the float with respect to the tube, a permanent magnet disposed in the float, the magnet serving to determine the location of the contacting element in the tube so that the contacting element moves in a direction and for a distance corresponding to the movement of the float.

2. A liquid level gauge comprising an elongated tube of rectangular cross section adapted to be suspended in a vertical position in a liquid storage tank, the tube being sealed at both ends and provided with a weighted base at its lower end, a pair of elongated contacting elements mounted within the tube parallel to the longitudinal axis thereof, a contacting element disposed in the tube and free to travel therein in contact with the pair of contacting elements, a source of voltage connected across said contacting elements, current indicating means connected in series with said source of voltage, an annular float mounted around said tube and adapted to float on the liquid in said storage tank, guide means affixed to the float and engaging a corner of the tube to center the float around the tube and to prevent rotation of the float with respect to the tube, a permanent magnet disposed in the float, the magnet serving to determine the location of the contacting element in the tube so that the contacting element moves in a direction and for a distance corresponding to the movement of the float.

3. Apparatus according to claim 2 wherein the tube is made of a non-metallic material of sufficient flexibility so that the tube may be coiled when not in use.

4. A liquid level gauge comprising an elongated tube of circular cross section adapted to be suspended in a vertical position in a liquid storage tank, a pair of elongated conductive elements mounted within the tube parallel to the longitudinal axis thereof, a contacting element disposed in the tube and free to travel therein in contact with the pair of conductive elements, a source of voltage connected across said conductive elements, current indicating means connected in series with said source of voltage, an annular float mounted around the tube and adapted to float on the liquid in said storage tank, the tube being provided with an external, longitudinal rib, guide means affixed to the float and engaging the rib to center the float about the tube and to prevent rotation of the float with respect to the tube, a magnet disposed in the float the magnet serving to fix the location of the contacting element in the tube so that the contacting element moves in a direction and for a distance corresponding to the movement of the float.

5. A liquid level gauge comprising an elongated tube of circular cross section and adapted to be suspended in a vertical position in a liquid storage tank, the tube being sealed at both ends and having a weighted base at its lower end, a pair of elongated conductive elements mounted within the tube parallel to the longitudinal axis thereof, a contacting element disposed in the tube and free to travel therein in contact with the pair of conductive elements, a source of voltage connected across said conductive elements, current indicating means connected in series with said source of voltage, an annular float mounted around the tube and adapted to float on the liquid in said storage tank, the tube being provided with an external, longitudinal rib, guide means affixed to the float and engaging the rib to center the float about the tube and to prevent rotation of the float with respect to the tube, a magnet disposed in the float, the magnet serving to fix the location of the contacting element in the tube so that the contacting element moves in a direction and for a distance corresponding to the movement of the float.

6. Apparatus according to claim 5 wherein the tube is made of a non-metallic material of sufficient flexibility so that the tube can be coiled when not in use.

JOHN C. MATCHETT.

REFERENCES CITED

The following references are of record in the file of this patent:

UNITED STATES PATENTS

| Number | Name | Date |
| --- | --- | --- |
| 995,414 | Nault | June 13, 1911 |
| 1,610,591 | Redman | Dec. 14, 1926 |
| 2,339,922 | Gatewood | Jan. 25, 1944 |
| 2,416,059 | Marchment | Feb. 18, 1947 |
| 2,284,690 | De Giers | Oct. 11, 1949 |